(12) United States Patent
Koski et al.

(10) Patent No.: US 7,862,471 B2
(45) Date of Patent: Jan. 4, 2011

(54) VALVE CONTROL SYSTEM

(75) Inventors: Jack P. Koski, South Lyon, MI (US); Mark A. Vernacchia, Northville, MI (US); Stephen W. Powell, South Lyon, MI (US)

(73) Assignee: GM Global Technology Operations, Inc.

( * ) Notice: Subject to any disclaimer, the term of this patent is extended or adjusted under 35 U.S.C. 154(b) by 633 days.

(21) Appl. No.: 11/853,168

(22) Filed: Sep. 11, 2007

(65) Prior Publication Data

US 2009/0069151 A1    Mar. 12, 2009

(51) Int. Cl.
*F16H 59/60* (2006.01)

(52) U.S. Cl. .............................. 477/97; 477/72; 477/76

(58) Field of Classification Search .................. 477/72, 477/76, 97, 98; 74/335
See application file for complete search history.

(56) References Cited

U.S. PATENT DOCUMENTS

| 5,803,863 | A  | * | 9/1998  | Hayward et al. ............... 477/98 |
| 6,142,282 | A  | * | 11/2000 | Rudisil et al. ............ 192/220.4 |
| 6,983,668 | B2 | * | 1/2006  | Powell et al. .................. 74/335 |
| 7,082,851 | B2 | * | 8/2006  | Whitmarsh et al. ....... 74/473.11 |
| 7,490,528 | B2 | * | 2/2009  | Koski et al. ............... 74/336 R |

* cited by examiner

*Primary Examiner*—Ha D. Ho (57) ABSTRACT

A solenoid control system for implementation with an electronic range selection (ETRS) system that shifts a transmission range between a park position and an out-of-park position. A first solenoid assembly is operable to control a fluid valve to supply pressurized fluid to urge a valve spool toward a first position. A second solenoid assembly is operable to control a fluid valve to supply pressurized fluid to urge said valve spool toward a second position. A control module selectively energizes one of the first and second solenoids based on a transmission fluid temperature.

15 Claims, 7 Drawing Sheets

VALVE CONTROL SYSTEM

FIELD

The present disclosure relates to automatic transmissions for motor vehicles and, more specifically, to an internal transmission range selection system using electronic controls.

BACKGROUND

Motorized vehicles include a power plant (e.g., combustion engine, or electric motor) that produces driving power. The driving power is transferred through a transmission to a driveline for driving a set of wheels at selected gear ratios. As is well known, automatic transmissions shift automatically to the appropriate gear ratio based on various vehicle operating conditions including speed and torque. Typically, a desired transmission operating mode or range is selected by the vehicle operator. The ranges provided by most automatic transmissions generally include Park, Neutral, Reverse and Drive. In Drive, the automatic transmission automatically shifts between two or more different forward gear ratios based on the vehicle operating conditions.

Traditionally, a driver interface device is provided which the vehicle operator shifts to select the desired transmission range. The driver interface device is linked to the automatic transmission by a range shift mechanism which typically includes a series of interconnected mechanical devices such as levers, push/pull rods, cables and the like. The number and size of such mechanical components make it difficult to package the range shift mechanism between the driver interface device and the transmission and can add significant frictional resistance to the overall system. As a result, the overall cost for design, manufacture and assembly of the vehicle is increased. In an attempt to address such issues related to mechanically-shifted transmission range shift mechanisms, several "shift-by-wire" range shift mechanisms have been developed.

At least one shift-by-wire range shift mechanism controls the operation of the transmission between a park and out-of-park mode using an electronically controlled solenoid valve operable to enable a flow of pressurized fluid within the transmission. The pressurized fluid operates a series of fluid control valves and a hydraulic servo valve assembly that shifts the transmission through a mechanical linkage system. Such a system may exhibit slow valve actuation at low transmission fluid temperatures. At fluid temperatures below around −10° C., high transmission fluid viscosity inhibits valve movement, slowing the range shift mechanism. Accordingly, an electronic transmission range select system with improved response time for shifting the transmission between a park and out-of-park mode is desired.

SUMMARY

The present disclosure describes a solenoid control system for implementation with an electronic transmission range selection (ETRS) system that shifts a transmission range between a park position and an out-of-park position. (While this invention is described within the context of an ETRS controls system, its usage is not limited to such a control system.) Once out-of-park, other transmission hydraulic or electromechanical devices provide transmission range (R, N, or D). A first solenoid assembly is operable to control a fluid valve to supply pressurized fluid to urge a valve spool toward a first position. A second solenoid assembly is operable to control a fluid valve to supply pressurized fluid to urge said valve spool toward a second position. A control module selectively energizes one of the first and second solenoids based on a transmission fluid temperature.

In another aspect of the present disclosure, a dual electromagnetic valve assembly is provided for implementation with an electronic transmission range selection system that shifts a transmission range between a park position and an out-of-park position. The dual electro-magnetic valve assembly includes a park servo valve moveable between a first position to enable the flow of pressurized fluid in a first path and a second position to inhibit the flow of pressurized fluid in the first flow path. A solenoid assembly is operable to move the servo valve between the first and second positions. The solenoid assembly is coupled to the servo valve and includes a first coil assembly operable to move the servo valve toward the second position and a second coil assembly coaxially aligned with the first coil assembly and operable to move the park servo valve toward the first position.

In yet another aspect of the present disclosure, a method for actuating a fluid control valve within a transmission equipped with an electronic transmission range selection system includes determining whether shift conditions exist to allow an Out-of-Park position to a Park position shift. The method also includes operating a solenoid assembly to control a fluid valve to supply and discontinue supply of pressurized fluid to operate a shift mechanism. A second solenoid assembly is operated to control the fluid valve based on a transmission fluid temperature and the shift conditions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit, an electronic circuit, a processor (shared, dedicated, or group) and memory that execute one or more software or firmware programs, a combinational logic circuit, or other suitable components that provide the described functionality.

Figure 1:
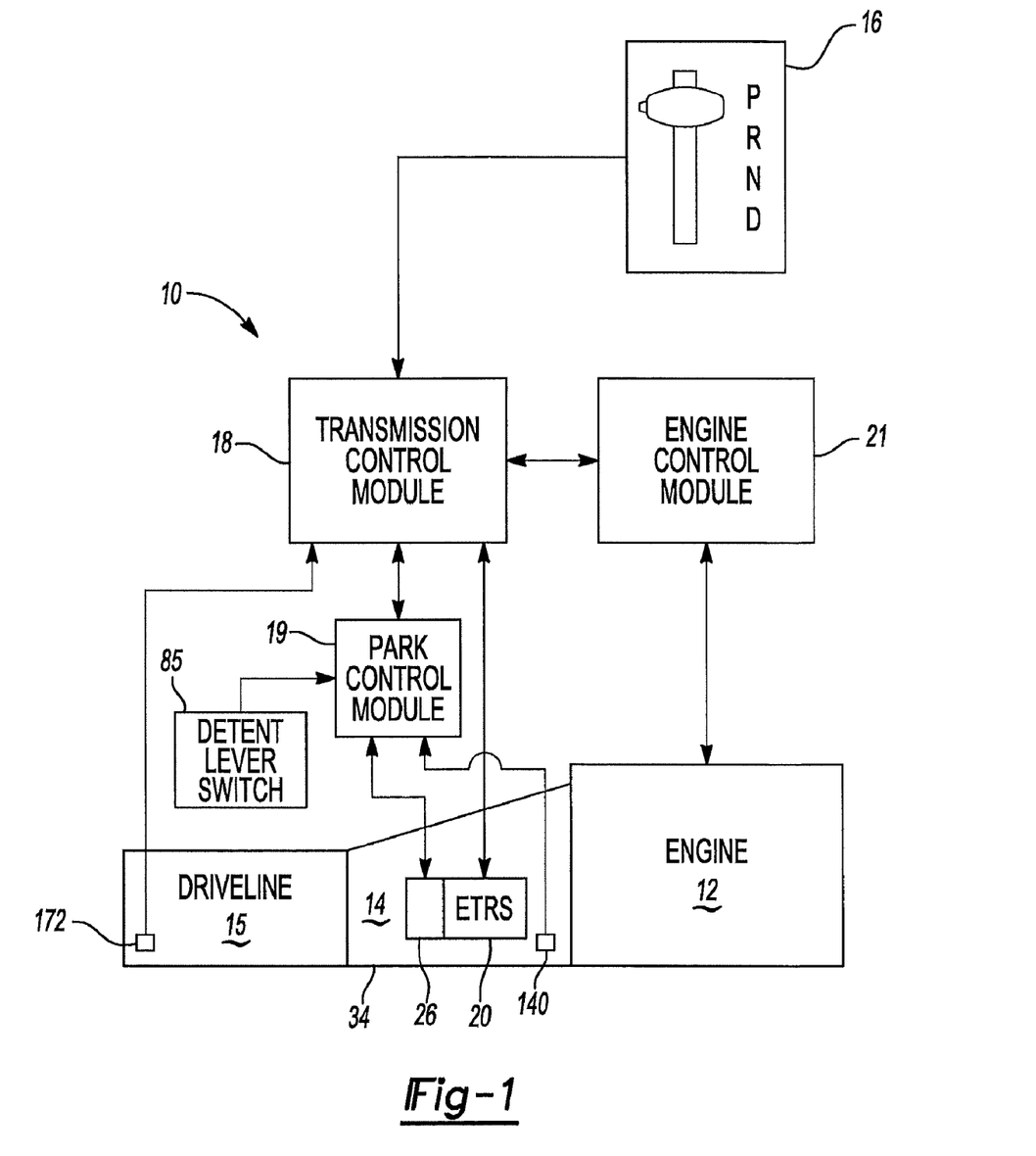
FIG. 1 is a block diagram of a partial powertrain for a vehicle having a transmission incorporating an ETRS system according to the principles of the present disclosure.

Referring now to FIG. 1, a partial schematic illustration of a vehicle 10 is shown. Vehicle 10 includes an engine 12 and an automatic transmission 14. The engine 12 produces driving torque that is transferred through the transmission 14 at varying gear ratios to a driveline 15 to drive at least one pair of wheels (not shown). A driver interface device 16 enables a vehicle operator to select various transmission range positions. The driver interface device 16 can include a lever, switches, dials, push-buttons or any other type of input interface desired. The normal transmission range positions, including Park, Reverse, Neutral, and Drive (PRND) may be selected, as well as manual downshifts and tap-up, tap-down capabilities via actuation of driver interface device 16. In operation, driver interface device 16 sends an electric mode signal to a transmission control module (TCM) 18 based on the selected transmission range.

TCM 18 signals an electronic transmission range selection (ETRS) system 20 to shift transmission 14 to the corresponding range in response to the electric mode signal. In addition, TCM 18 communicates with an electromagnetic valve assembly (either directly or through a park control module 19) associated with ETRS system 20 to assist ETRS system 20 to shift the transmission between a Park mode and an Out-of-Park mode. For purposes of clarity, ETRS system 20 is considered to be operating in a "Park" mode when transmission 14 is in its Park range and to be operating in an "Out-of-Park" mode when transmission 14 is in any other of the available ranges. An engine control module (ECM) 21 is also provided to receive inputs from and send control signals to the engine 12. Additionally, ECM 21 interfaces with TCM 18 to determine the operational range of the transmission 14.

Figure 2:
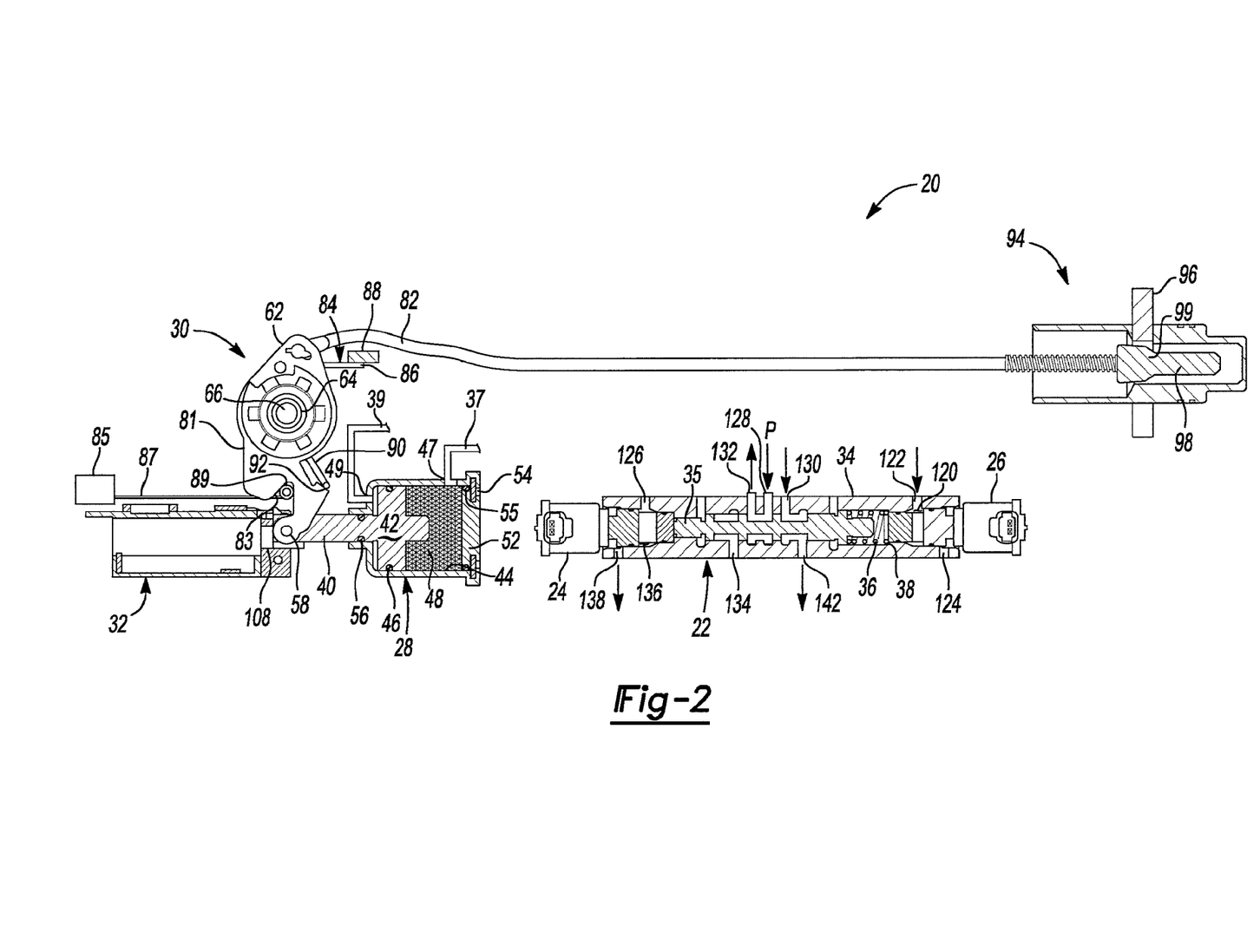
FIG. 2 is a partial cross-sectional view of the ETRS system of FIG. 1 shown in the Park position.

Referring now to FIG. 2, ETRS system 20 may be an integral part of the transmission 14 and is operable to manipulate the flow of pressurized fluid to shift the transmission 14 between its available transmission ranges. The ETRS system 20 includes a servo valve 22, a servo valve solenoid 24, a return-to-park (RTP) solenoid 26, a hydraulic servo assembly 28 and a two-position detent lever assembly 30. ETRS system 20 also includes a park inhibit solenoid assembly 32 that prevents shifting from the Out-of-Park mode into the Park mode in the event of a loss of pressurized fluid under specific circumstances. It should be appreciated that the Figures depict one of many devices operable to inhibit movement of certain components. Other movement inhibiting configurations are contemplated as being within the scope of this disclosure.

Figure 3:
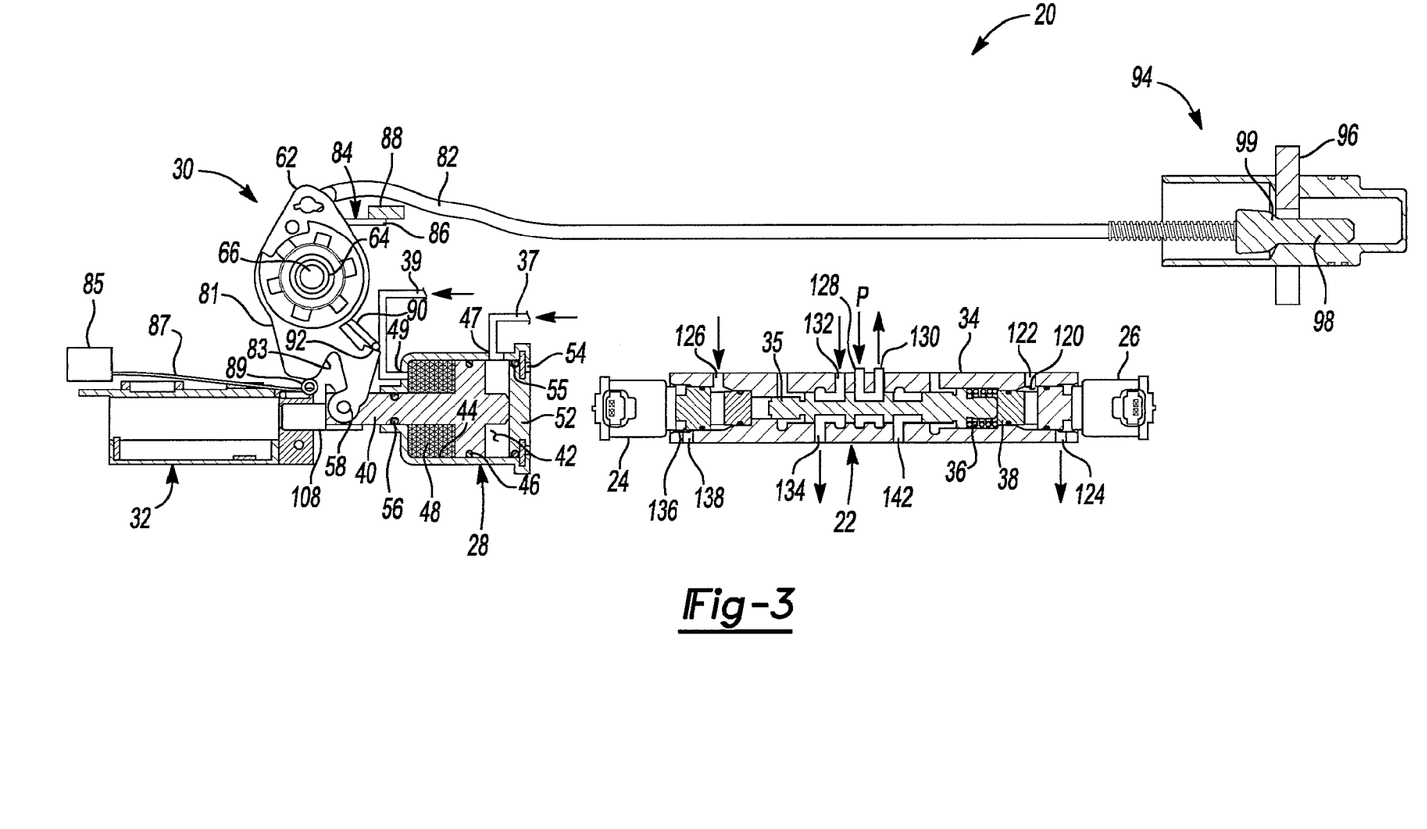
FIG. 3 is a partial cross-sectional view of the ETRS system of FIG. 1 shown in the Out-of-Park position.

Referring now to FIGS. 2-3, at least some of the ETRS components are shown supported within a housing 34 associated with the transmission 14 and which defines a valve body having a series of fluid flow passages. FIG. 2 illustrates the position of the various components when ETRS system 20 is shifted into its Park mode. In contrast, FIG. 3 illustrates the same components moved to positions corresponding to ETRS system 20 operating in its Out-of-Park mode. In particular, servo valve 22 includes a spool 35 slidably supported within housing 34 for movement between a first position (FIG. 2) and a second position (FIG. 3). Spool 35 is biased to its first position by a spring 36. Spring 36 is disposed between the bottom of the spool bore in the housing 34 or an axially moveable piston 38 and spool 35. In its first position, spool 35 allows the flow of pressurized fluid in a first fluid path 37 to hydraulic servo assembly 28. In its second position, spool 35 allows the flow of pressurized fluid in a second fluid path 39 to hydraulic servo assembly 28. As discussed in further detail below, the servo valve solenoid 24 and RTP solenoid 26 can be selectively actuated to control a supply of pressurized fluid for moving the spool 35 between its first and second positions. Specifically, RTP solenoid 26 can be selectively actuated to provide pressurized fluid to the spring side of spool 35 (or piston 38) to assist spring 36 to move spool 35 from an Out-of-Park to a Park position at low transmission fluid temperatures.

Referring still to FIGS. 2-3, hydraulic servo assembly 28 is shown to include a servo pin 40 having a servo piston 42 fixed to one end. Servo piston 42 is slidably supported within a cylinder 44 formed in housing 34 and includes an annular piston seal 46 disposed between servo piston 42 and cylinder 44. Ports 47, 49 formed in the housing 34 provide a fluid communication path to a pressure chamber 48 formed within cylinder 44. Hydraulic servo assembly 28 further includes a servo cap 52 that is fixed to housing 34 by a retainer ring 54 and a seal 55 disposed between servo cap 52 and housing 34 to seal one end of pressure chamber 48. An optional seal 56 is disposed between servo pin 40 and housing 34 to seal an opposite end of pressure chamber 48. Servo pin 40 is coupled to one end of detent lever assembly 30 by a pin 58. Servo piston 42 and servo pin 40 are biased to a first position (see FIG. 2) by detent lever assembly 30. As described in further detail below, the flow of pressurized fluid through first fluid path 37 and port 47 into the pressure chamber 48 induces movement of servo piston 42 and servo pin 40 to the first position, whereas the flow of pressurized fluid through second fluid path 39 and port 49 into pressure chamber 48 induces movement of servo piston 42 and servo pin 40 to a second position (see FIG. 3) against the biasing force exerted thereon by detent lever assembly 30. Detent lever assembly 30 is shown to include a detent lever 62, a bushing 64 and a manual shaft 66. Manual shaft 66 is rotatably supported in one or more aligned apertures in the transmission case and extends through bushing 64. Bushing 64 is retained in detent lever 62, whereby detent lever 62 is rotatably supported by bushing 64.

One end of detent lever 62 is adapted to receive pin 58 to connect detent lever 62 to servo pin 40 of hydraulic servo assembly 28. A second end of detent lever 62 facilitates attachment of a first end of an actuator rod 82 to detent lever 62. A torsion spring 84 is disposed about the bushing 64 and functions to bias detent lever 62 to rotate to a park position (FIG. 2). A first end 86 of the torsion spring 84 rests against a stationary anchor portion 88 (FIG. 2) of the transmission case while a second end 90 of the torsion spring 84 engages a flange segment 92 of detent lever 62.

The second end of actuator rod 82 is coupled to, or engages, an actuator assembly 94 that is operable to selectively move a park lug 96 between a Park range position and the Out-of-Park range position. Accordingly, actuator rod 82 is shown to include a cam lug 98 having a sloped face 99 which engages park lug 96 and thereby moves park lug 96 in response to the movement of actuator rod 82. As will be detailed, movement of servo piston 42 from its first position to its second position causes servo pin 40 to pull on the detent lever 62. In response, detent lever 62 is induced to rotate from its park position to an Out-of-Park position (FIG. 3) against the biasing force of torsion spring 84. Such rotary movement of detent lever 62 causes actuator rod 82 to move from a first position (FIG. 2) to a second position (FIG. 3) for moving park lug 96 to its Out-of-Park range position.

Detent lever 62 further includes a cam leg 81 having a cam face 83 adapted to provide an alternative means to return the detent lever 62 to the Park position in conjunction with a detent spring 87. Detent spring 87 is anchored to a stationary anchor portion 85. Cam follower 89 is adapted to ride along cam face 83 as detent lever 62 is rotated between a Park position and an Out-of-Park position.

When vehicle 10 is operating at or below the threshold speed, park inhibit solenoid assembly 32 is de-energized to enable ETRS system 20 to shift into the Park mode if so desired. More specifically, to enable rotation of detent lever 62 back to its park position, park inhibit solenoid assembly 32 is de-energized.

While operating vehicle 10, the vehicle operator may choose either to shift from Park to an Out-of-Park range, between Out-of-Park Ranges (e.g. between a Drive and Reverse range), or from an Out-of-Park to a Park range. As previously described, the present disclosure relates to shifts between a Park and Out-of-Park range. Accordingly, only the operation of vehicle 10 to shift transmission 14 between an Out-of-Park and a Park range will be discussed. It should be appreciated that the teachings of the present disclosure may also be applied to improve the operation of transmission 14 in shifting between the various Drive ranges.

In operation, the vehicle operator selects a desired transmission range through manipulation of driver interface device 16. Driver interface device 16 sends an electronic signal to TCM 18. Based upon the signal from driver interface device 16 and certain signals communicated by ECM 21 and driveline 15, TCM 18 commands a transmission range shift by sending an appropriate mode signal to ETRS system 20 directly or through the optional park control module 19. The transmission range shift includes shifting the transmission range from Park to an Out-of-Park range and enabling the flow of pressurized fluid at a desired transmission line pressure to Drive range shift components (not shown) of transmission 14. Conversely, the transmission range shift further includes shifting the transmission range from Out-of-Park to a Park range and prohibiting the flow of pressurized fluid to Drive range shift components. These two operating modes will now be discussed in turn.

Referring now to FIG. 3, the operation of vehicle 10 to shift the transmission from a Park to an Out-of-Park range will now be described in detail. As previously stated, TCM 18 sends a signal to ETRS system 20 or park control module 19 to shift the transmission from a Park to an Out-of-Park range. The signal de-energizes RTP solenoid 26, concurrently prohibiting the flow of pressurized fluid into a cavity 120 through a port 122 and allowing any fluid pressure in cavity 120 to exhaust through a port 124. In this manner the TCM command enables servo valve 22 to move from a Park to an Out-of-Park range as will now be described.

The signal sent from TCM 18 to ETRS system 20 actuates servo valve solenoid 24 to enable flow of pressurized fluid to the spool 35 through a port 126 (see FIG. 2). Pressurized fluid acts on spool 35 to move it from its first position to its second position. With the spool 35 located in its second position, pressurized fluid is supplied from servo valve 22 to the hydraulic servo assembly 28. More specifically, pressurized fluid flows into an inlet port 128 of the servo valve 22 and out through an outlet port 130 to port 49 of hydraulic servo assembly 28 via fluid path 39. Pressurized fluid within fluid path 39 enters one end of pressure chamber 48 of hydraulic servo assembly 28 via port 49. This flow of pressurized fluid into pressure chamber 48 causes movement of servo piston 42 from its first position to its second position. Concurrently, fluid within an opposite end of pressure chamber 48 is forced out port 47 and into fluid path 37. In its second position, servo valve 22 allows fluid in fluid path 37 to enter housing 34 through a port 132 and exhaust through a port 134.

Movement of servo piston 42 causes servo pin 40 to move from its first position to its second position in opposition to the biasing of spring 84. Sliding movement of servo pin 40 causes corresponding movement of detent lever 62 from its Park position to its Out-of-Park position. In turn, rotation of the detent lever 62 induces a pulling force on the actuator rod 82, thereby shifting the transmission range to the Out-of-Park position. Rotation of detent lever 62 also induces a change in the signal provided by park inhibit solenoid assembly 32 to TCM 18. More specifically, rotation of detent lever 62 causes cam follower 89 to move along cam face 83 and move detent spring 87 from a Park position to an Out-of-Park position.

Following actuation of ETRS system 20 into its Out-of-Park mode (see FIG. 3), park inhibit solenoid assembly 32 is actuated. In particular, extension arm 108 contacts servo pin 40, thereby prohibiting detent lever 62 from rotating back to its Park position. Park inhibit solenoid assembly 32 maintains extension arm 108 in its extended position while vehicle 10 is traveling above the threshold speed. In the event of a loss of fluid pressure, actuator assembly 94 is prevented from shifting the transmission range into Park while the vehicle is moving. Once vehicle 10 is below the threshold speed, and assuming there is no fluid pressure holding the ETRS system 20 in the Out-of-Park mode, park inhibit solenoid assembly 32 is de-energized to retract the extension arm 108 and permit torsion spring 84 to rotate the detent lever 62 to shift the transmission range into the Park position.

Referring now to FIG. 2, the operation of vehicle 10 to shift the transmission from an Out-of-Park to a Park range will now be described in detail. As previously stated, TCM 18 sends a signal to ETRS system 20 directly or through the optional park control module 19 to shift transmission 14 from an Out-of-Park to a Park range. The signal sent from TCM 18 to ETRS system 20 de-energizes park inhibit solenoid assembly 32 to retract the extension arm 108 and permit detent lever 62 to rotate to shift the transmission range into the Park position. Concurrently, the signal sent from TCM 18 to ETRS system 20 de-energizes servo valve solenoid 24 to simultaneously prohibit flow of pressurized fluid to the spool 35 through port 122 and enable pressurized fluid in a cavity 136 to exhaust through a port 138 (see FIG. 2).

TCM 18 or optional park control module 19 receives a signal indicative of the operating temperature of the transmission fluid from a transmission fluid temperature sensor 140 (see FIG. 1) and a signal from park inhibit solenoid assembly 32 to determine a control sequence for servo valve solenoid 24, RTP solenoid 26 and park inhibit solenoid assembly 32. As is known, the viscosity of transmission fluid used in transmission 14 depends upon its temperature; the lower the temperature, the higher the viscosity. Accordingly, the flow rate of fluid within fluid paths in the transmission at given pressures will be decreased at lower temperatures. Thus, at relatively low transmission fluid temperatures, the movement of spool 35 caused by spring 36 may be impeded by the reduced flow rate of fluid from cavity 136 at low fluid temperatures. Accordingly, if the transmission fluid temperature is below a predetermined threshold, TCM 18 or optional park control module 19 will signal RTP solenoid 26 to energize. At this time, pressurized fluid is supplied to cavity 120 through port 122. Pressurized fluid within cavity 120 acts on the spool valve 35 or piston 38. If present, piston 38 applies a force to spool 35. In this manner, TCM 18 or optional park control module 19 controls RTP solenoid 26 to assist spring 36 in moving spool 35 from the Out-of-Park to the Park position. The use of RTP solenoid 26 in combination with spring 36 reduces the response time of ETRS system 20 in shifting from an Out-of-Park to a Park range.

With spool 35 located in its Park position, pressurized fluid is supplied from servo valve 22 to hydraulic servo assembly 28 to move detent lever 62 to a Park position. More specifically, pressurized fluid flows into inlet port 128 of the servo valve 22 and out through outlet port 132 to port 47 via fluid path 37. Pressurized fluid within fluid path 37 enters one end of pressure chamber 48 of hydraulic servo assembly 28 via port 47. This flow of pressurized fluid into pressure chamber 48 causes movement of servo piston 42 from its second position to its first position. Concurrently, fluid within an opposite end of pressure chamber 48 is forced out port 49 and into fluid path 39. In the Park position, spool 35 allows fluid in fluid path 39 to enter housing 34 through outlet port 130 and exhaust through a port 142. Such movement of servo piston 42 causes servo pin 40 to move from its second position to its first position. Sliding movement of servo pin 40 is assisted by biasing spring 84 and causes corresponding movement of detent lever 62 from its Out-of-Park position to its Park position. Rotation of the detent lever 62 induces a pushing force on the actuator rod 82, thereby shifting the transmission range to the Park position. Rotation of detent lever 62 also induces a change in the signal provided by park inhibit solenoid assembly 32 to TCM 18. More specifically, rotation of detent lever 62 causes cam follower 89 to move along cam face 83 and move detent spring 87 from an Out-of-Park to a Park position.

Figure 4:
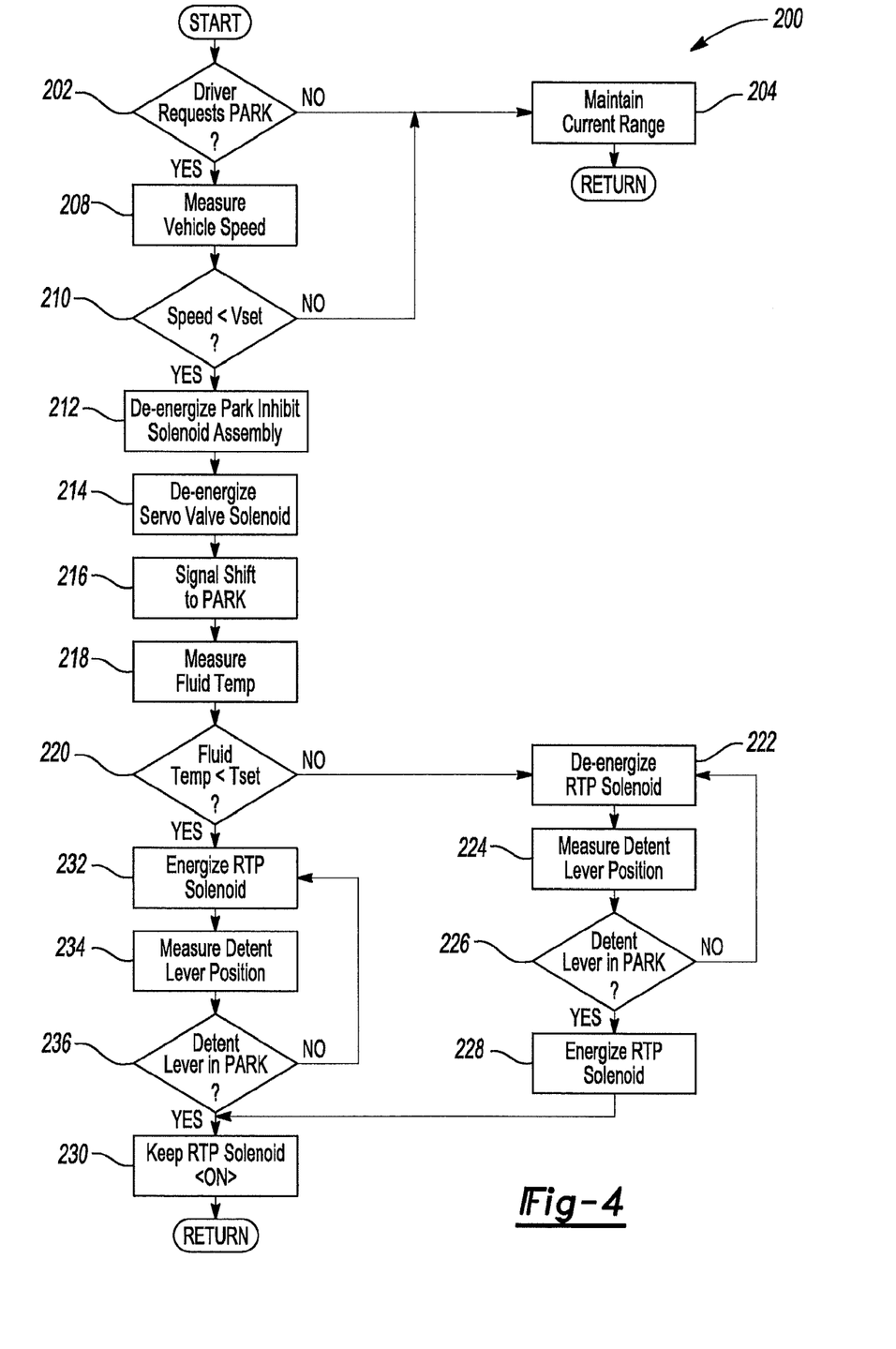
FIG. 4 is a flow diagram illustrating the control sequence for operating the return-to-park solenoid assembly associated with the ETRS system of FIG. 1.

With reference now to FIG. 4, the logical operation of TCM 18 and park control module 19 in controlling ETRS 20, and specifically RTP solenoid 26, to improve the speed of a transmission range shift will now be described in detail. More particularly, a control method 200 is provided to control the operation of RTP solenoid 26, servo valve solenoid 24, and park inhibit solenoid assembly 32 to improve a transmission range shift from an Out-of-Park to a Park range at low transmission fluid temperatures. Control method 200 may be implemented as computer programs stored in the memories of TCM 18 or optional park control module 19 that run periodically while engine 12 is running to generate control signals that operate RTP solenoid 26, servo valve solenoid 24, and park inhibit solenoid assembly 32. Generally, control method 200 will be run at the same frequency as other transmission range control routines within TCM 18, typically every 100 msec while the engine is running.

Control method 200 begins with a block 202, wherein TCM 18 monitors the signal provided by driver interface device 16 to determine if the vehicle operator has requested that transmission 14 be shifted into a park position. If the driver has not requested Park, control proceeds to a block 204 where TCM 18 generates a signal to maintain the current transmission drive range. If the vehicle operator has requested Park, control proceeds to a block 208 where TCM 18 determines the instant vehicle speed. Vehicle speed may be measured and determined by any commonly used methods available. Generally these methods rely on a signal generated by one or more vehicle speed sensors 172 (see FIG. 1) coupled to driveline 15. TCM 18 subsequently compares the instant vehicle speed with a predetermined speed value, represented as "Vset" in FIG. 4, at block 210. If the instant vehicle speed is not below the predetermined value, control proceeds back to block 204, where TCM 18 generates output signals as previously described. If the instant vehicle speed is below the predetermined value, control proceeds to a block 212 where TCM 18 generates a control signal to de-energize park inhibit solenoid assembly 32 and a block 214 where TCM 18 generates a signal to ETRS system 20 to de-energize servo valve solenoid 24 and thereby allow servo valve 22 to move from an Out-of-Park to a Park position as previously described.

At a block 216, TCM 18 generates a command signal to park control module 19, if present, indicating a shift to Park is desired. Subsequently, at a block 218, park control module 19 obtains the instant transmission fluid temperature as provided by temperature sensor 140. Next, at block 220, park control module 19 compares the instant transmission fluid temperature with a predetermined value, represented as "Tset" in FIG. 4. Generally, the value of Tset will be around −10° C. for reasons that will be described. If the instant fluid temperature is at or above Tset, control proceeds to a block 222 where park control module 19 generates a control signal to de-energize RTP solenoid 26 while ETRS system 20 executes the shift to Park. It should be noted that RTP solenoid 26 is de-energized while the transmission is operated in a drive range. As such, the control of RTP solenoid 26 at block 222 may operate to maintain a control signal to de-energize RTP solenoid 26.

At blocks 224, 226, TCM 18 or optional park control module 19 continues to monitor the position of detent lever 62 as provided in the signal produced by park inhibit solenoid assembly 32. While detent lever 62 is rotating from an Out-of-Park to a Park position, control returns back to block 222 and park control module 19 maintains the signal to de-energize RTP solenoid 26. Once the signal from park inhibit solenoid assembly 32 indicates that detent lever 62 has moved into the Park position, control proceeds to blocks 228, 230 where park control module 19 generates and maintains a signal to energize RTP solenoid 26. From block 230, control proceeds back to block 202 to begin another cycle in control method 200.

Returning to block 220, if the instant transmission fluid temperature is below the predetermined value, Tset, control proceeds to a block 232 where park control module 19 generates a signal to energize RTP solenoid 26 in order to cause the flow of pressurized fluid into cavity 120. The flow of pressurized fluid into cavity 120 acts on spool valve 35 or piston 38 to assist spring 36 to move servo valve 22 into a Park position as previously described. In this manner, transmission control module 18 and park control module 19 operate together to improve the response time of transmission 14 in shifting into a Park range. Next, at blocks 234, 236, park control module 19 continues to monitor the position of detent lever 62 as provided by park inhibit solenoid assembly 32. While detent lever 62 is rotating from an Out-of-Park to a Park position, control returns back to block 232 and park control module 19 maintains the signal to energize RTP solenoid 26. Once the signal from park inhibit solenoid assembly 32 indicates that detent lever 62 has moved into the Park position, control proceeds to block 230 where TCM 18 or optional park control module 19 maintains a signal to energize RTP solenoid 26. Because RTP solenoid 26 remains energized, pressurized fluid is also applied to spool valve 35 or piston 38. Therefore, the force applied by spool valve 35 or piston 38 will be supplemented by the force output of spring 36 to assure the spool 35 remains in the Park position. From block 230, control proceeds back to block 202 to begin another cycle in control method 200.

Figure 5:
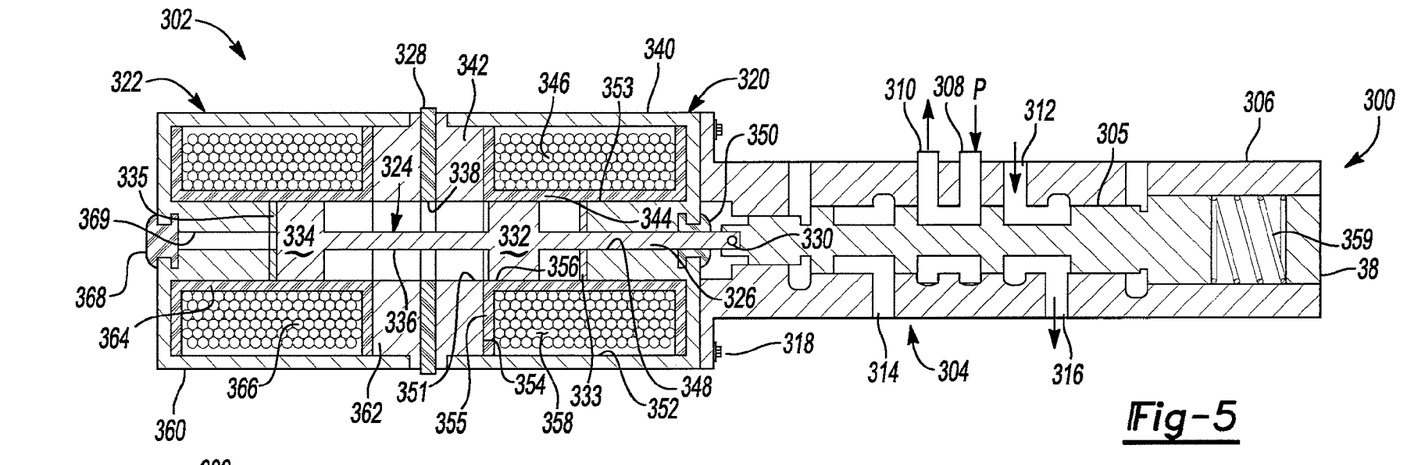
FIG. 5 is a partial cross-sectional view of an electromagnetic valve assembly according to the principles of the present disclosure showing the electromagnetic valve assembly in a Park position.
Figure 6:
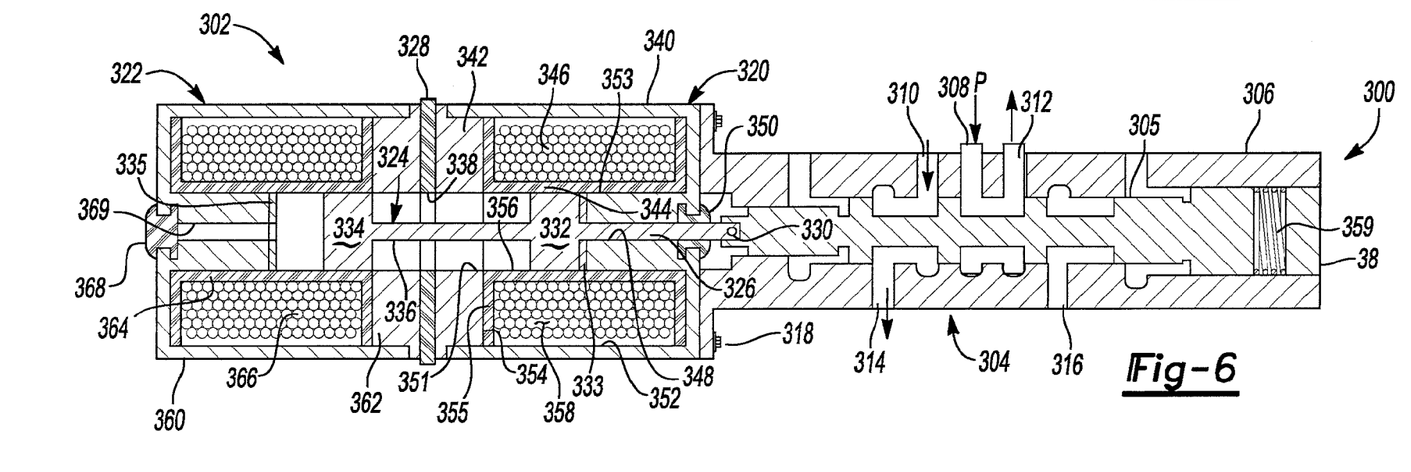
FIG. 6 is a partial cross-sectional view of the electromagnetic valve assembly of FIG. 5 shown in an Out-of-Park position.

Referring now to FIGS. 5-6, an alternate ETRS system 300 in accordance with the present teachings will now be described in detail. In view of the substantial similarity in structure and function of the components associated with ETRS system 20 and ETRS system 300, like reference numerals are used in the drawings to identify like components. ETRS system 300 includes a dual electromagnetic solenoid assembly (DEM) 302, a servo valve 304, hydraulic servo assembly 28 (FIG. 2), detent lever assembly 30 (FIG. 2), and park inhibit solenoid assembly 32 (FIG. 2). DEM solenoid assembly 302 is selectively operable to move a spool 305 of park servo valve 304 between a first position and a second position to control the flow of pressurized fluid to hydraulic servo assembly 28. Hydraulic servo assembly 28 is operable to rotate detent lever assembly 30 between a Park and Out-of-Park position to shift the transmission between a Park and Out-of-Park position via park actuator assembly 94 as previously described. For clarity, FIG. 5 illustrates the position of DEM solenoid assembly 302 and spool 35 when ETRS system 300 is shifted into its Park mode. FIG. 6 illustrates the position of the same components when ETRS system 300 is shifted into its Out-of-Park mode.

DEM solenoid assembly 302 and park servo valve 304 are shown supported by a housing 306 associated with transmission 14 that defines a valve body having a series of ports and fluid flow passages. In particular, spool 305 is slidably supported within housing 306 for movement between a first position (FIG. 5) and a second position (FIG. 6). In its first position, spool 305 allows pressurized fluid to enter a port 308 in housing 306 and exit a port 310 into first fluid path 37 to hydraulic servo assembly 28 as previously described. Similarly, in its second position, spool 305 allows pressurized fluid to enter through port 308 in housing 306 and exit via a port 312 into second fluid path 39 to hydraulic servo assembly 28 as previously described. Housing 306 further includes ports 314, 316 that permit the flow of fluid leaving hydraulic servo valve 28 through fluid paths 37, 39, respectively. As will now be discussed, DEM solenoid assembly 302 can be selectively actuated to move park servo valve 304 between its first and second positions.

As shown, DEM solenoid assembly 302 is co-axially aligned with park servo valve 304 and coupled to housing 306 at one end of park servo valve 304. While threaded fasteners 318 are shown to secure DEM solenoid assembly 302 to housing 306, it should be appreciated that other means for securing DEM solenoid assembly 302 to housing 306 may be implemented.

DEM solenoid assembly 302 includes a first coil assembly 320, a second coil assembly 322, an armature 324, a valve control rod 326, and an intermediate mounting plate 328. Valve control rod 326 is fixed to spool 305. First coil assembly 320 is selectively operable to move spool 305 to an Out-of-Park position (FIG. 6), while second coil assembly 322 is selectively operable to move spool 35 to a Park position (FIG. 5). First coil assembly 320 and second coil assembly 322 may be alternately energized to induce movement of armature 324. In this manner, DEM solenoid assembly 302 is selectively operable to move spool 305 between its first and second positions. Valve control rod 326 extends through one end of DEM solenoid assembly 302. Valve control rod 326 is threadingly engaged with armature 324 on one end and coupled to spool 305 by a pin 330 on an opposite end.

Armature 324 is generally cylindrical in shape and is slidingly positioned within DEM solenoid assembly 302. Armature 324 is formed of a ferromagnetic material, such as iron, and includes a first end 332, a second end 334, and a body 336. First end 332 is slidingly positioned within first coil assembly 320, while second end 334 is slidingly positioned within second coil assembly 322. Body 336 interconnects first end 332 and second end 334.

A first stop 333 is disposed within first coil assembly 320 to limit axial movement of armature 324 within first coil assembly 320. Similarly, a second stop 335 is disposed within second coil assembly 322 to limit axial movement of armature 324 within second coil assembly 322. While armature 324 is shown in one piece, it should be appreciated that it may comprise an assembly. Armature 324 is magnetized such that coil assembly 320, 322 may induce corresponding movement of armature 324 when energized.

Intermediate mounting plate 328 is disposed between and couples adjacent ends of first coil assembly 320 and second coil assembly 322. Intermediate mounting plate 328 may be formed of either a ferrous or non-ferrous material, as may be desired, and includes a cylindrical aperture 338 extending along the axis of DEM solenoid assembly 302, thereby allowing armature 324 to extend therethrough.

First coil assembly 320 includes a housing 340, an end cap 342, a bobbin 344, and an electromagnetic coil 346. Housing 340 is adapted to receive end cap 342 and thereby form an enclosure for bobbin 344 and electromagnetic coil 346. Additionally, Housing 340 includes an aperture 348 disposed along the axis of DEM solenoid assembly 302 for slidably supporting valve control rod 326 and a seal 350 to prohibit the intrusion of transmission fluid into DEM solenoid assembly 302. End cap 342 couples housing 340 to intermediate mounting plate 328. End cap 342 includes an aperture 351 extending along the axis of DEM solenoid assembly 302 to allow armature 324 to extend therethrough.

Bobbin 344 includes a generally cylindrically shaped body 353 and radially outwardly extending flanges 355 formed at each end of body 353. Bobbin 344 is fixedly positioned within housing 340 by a wall 352 of housing 340 and a face 354 of end cap 342. Bobbin 344 is formed of a non-ferromagnetic, non-electrically conductive material, and includes a cylindrical aperture 356 for slidably supporting first end 332 of armature 324. First coil 346 is wrapped about body 353 and positioned between flanges 355 within an aperture 358. Apertures 356, 358 are coaxially aligned with one another and with second coil assembly 322 to allow armature 324 to move freely between its first and second position under the magnetic influence of coil assemblies 320, 322. First coil 346 is formed of electrically conductive wire looped in a uniform manner around bobbin 344 to form a cylindrical coil. First coil 346 is selectively operable to generate a magnetic field when energized with electric current sufficient to induce first end 332 of armature 324 to move to a second position as shown in FIG. 6 against the force of a bias spring 359.

Second coil assembly 322 is coupled to first coil assembly 320 as previously described and includes a housing 360, an endcap 362, a bobbin 364, and an electromagnetic coil 366 having the same structure as housing 340, endcap 342, bobbin 344, and coil 346 of first coil assembly 320. In contrast, coil 366 is selectively operable to generate a magnetic field when energized with electric current to induce second end 334 of armature 324 to a first position as shown in FIG. 5. Additionally, housing 360 includes a plug 368 disposed on one end of housing 360 to seal an aperture 369 having the same structure as aperture 348.

Referring still to FIGS. 5-6, the operation of vehicle 10 to shift the transmission between a Park and Out-of-Park range will now be described. When a shift from Park to Out-of-Park is desired, TCM 18 sends a signal to ETRS system 300 and park control module 19 to shift the transmission from a Park to an Out-of-Park range. In turn, park control module 19 generates a signal to control the operation of DEM solenoid assembly 302 to move spool 305 from a Park position (FIG. 5) to an Out-of-Park position (FIG. 6). Specifically, park control module 19 simultaneously energizes first coil assembly 320 and de-energizes second coil assembly 322 to translate armature 324 and spool 305 from a Park to an Out-of-Park position against the force of bias spring 359. In the Out-of-Park position, spool 305 enables the flow of pressurized fluid to through port 308 to hydraulic servo valve 28 via port 312 as previously described. In this manner, DEM solenoid assembly 302 is operable to control hydraulic servo valve assembly 28 and detent lever assembly 30 to shift the transmission from Park to an Out-of-Park range as previously described.

When a shift from Out-of-Park to Park is desired, TCM 18 sends a signal to ETRS system 300 and park control module 19 to shift the transmission from an Out-of-Park to a Park range. In turn, park control module 19 generates a signal to control the operation of DEM solenoid assembly 302 to move park servo valve 304 from an Out-of-Park position (FIG. 6) to a Park position (FIG. 5). Specifically, park control module 19 simultaneously de-energizes first coil assembly 320 and energizes second coil assembly 322, inducing armature 324 to move from an Out-of-Park to a Park position and thereby assist bias spring 359 to move spool 35 into a Park position. In the Park position, spool 305 enables the flow of pressurized fluid to through port 308 to hydraulic servo valve 28 via port 310 as previously described. In this manner, DEM solenoid assembly 302 is operable to control hydraulic servo valve assembly 28 and detent lever assembly 30 to shift the transmission from an Out-of-Park to a Park range as previously described.

Figure 7:
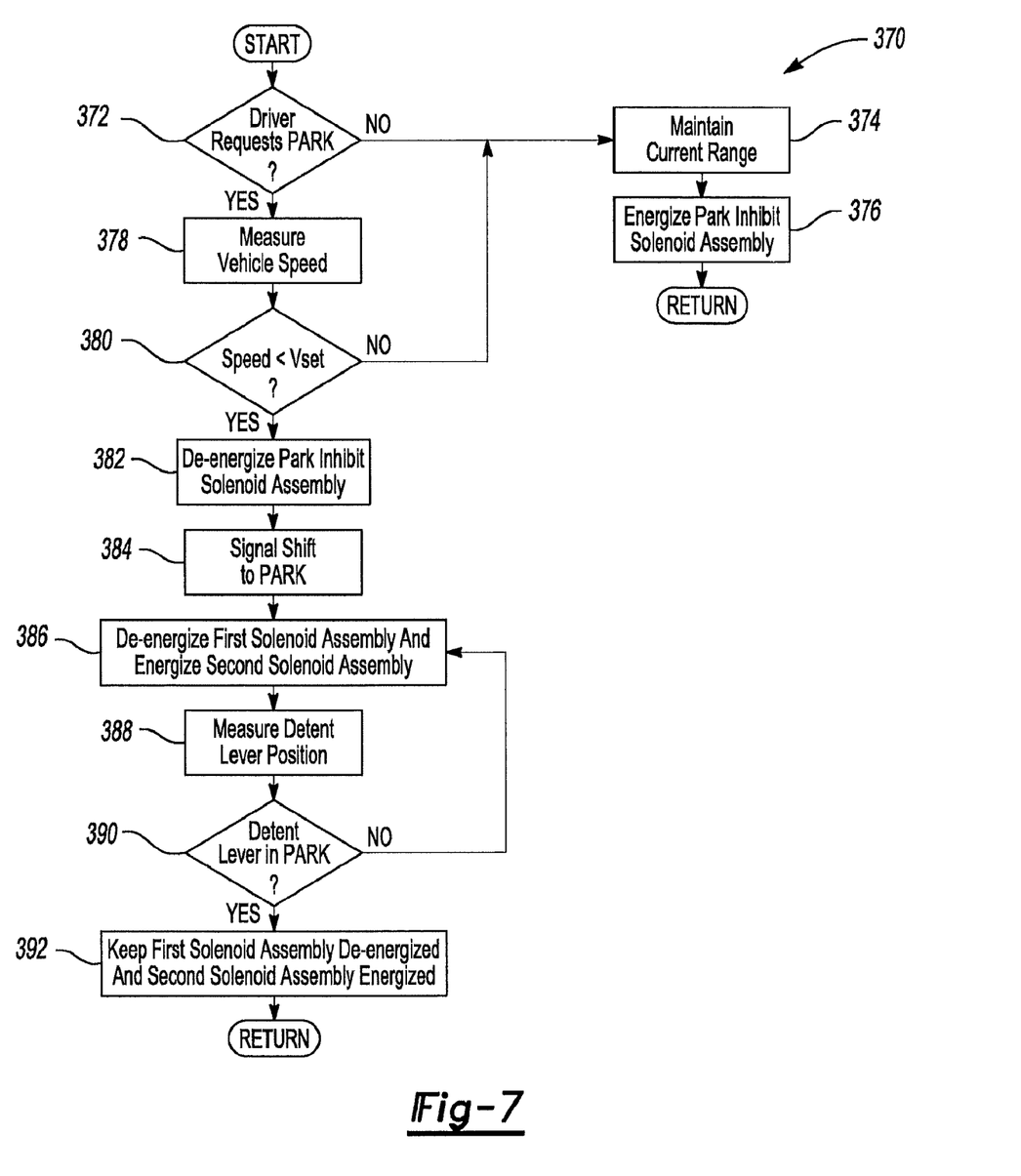
FIG. 7 is a flow diagram illustrating the control sequence for operating the electromagnetic valve assembly associated with the ETRS system of FIGS. 8-9.

Referring to FIG. 7, the logical operation of ETRS system 300 will now be described. A control method 370 is provided to control the operation of first coil assembly 320, second coil assembly 322, and park inhibit solenoid assembly 32 to improve a transmission range shift from an Out-of-Park to a Park range. Control method 370 begins with a block 372, wherein TCM 18 monitors the signal provided by driver interface device 16 to determine whether the vehicle operator has requested that transmission 14 be shifted into a Park position. If the driver has not requested Park, control proceeds to a block 374 where TCM 18 generates a signal to maintain the current transmission drive range.

If the vehicle operator has requested Park, control proceeds to a block 378 where TCM 18 determines the instant vehicle speed as previously provided. TCM 18 subsequently compares the instant vehicle speed with a predetermined speed value (Vset) at a block 380. If the instant vehicle speed is not below the predetermined speed value, control proceeds back to block 374 where TCM 18 generates output signals as previously described. If the instant vehicle speed is below the predetermined speed value, control proceeds to a block 382 where TCM 18 generates a control signal to de-energize park inhibit solenoid assembly 32.

Control proceeds to a block 384 where TCM 18 generates a command signal to park control module 19 indicating a shift to park is desired. At block 386, park control module 19 generates a control signal to simultaneously de-energize first coil assembly 320 and energize second coil assembly 322 to translate spool 305 from an Out-of-Park to a Park position as previously described. At blocks 388, 390, park control module 19 continues to monitor the position of detent lever 62. While detent lever 62 is rotating from an Out-of-Park to a Park position, control returns back to block 386 and park control module 19 maintains the signal to de-energize first coil assembly 320 and energize second coil assembly 322. Once the signal from park inhibit solenoid assembly 32 indicates that detent lever 62 has moved into the Park position, control proceeds to a block 392 where park control module 19 maintains a signal to de-energize first coil assembly 320 and energize second coil assembly 322 to assist ETRS system 300 in maintaining the transmission in the Park range. From block 392, control proceeds back to block 372 to begin another cycle in control method 370.

Figure 8:
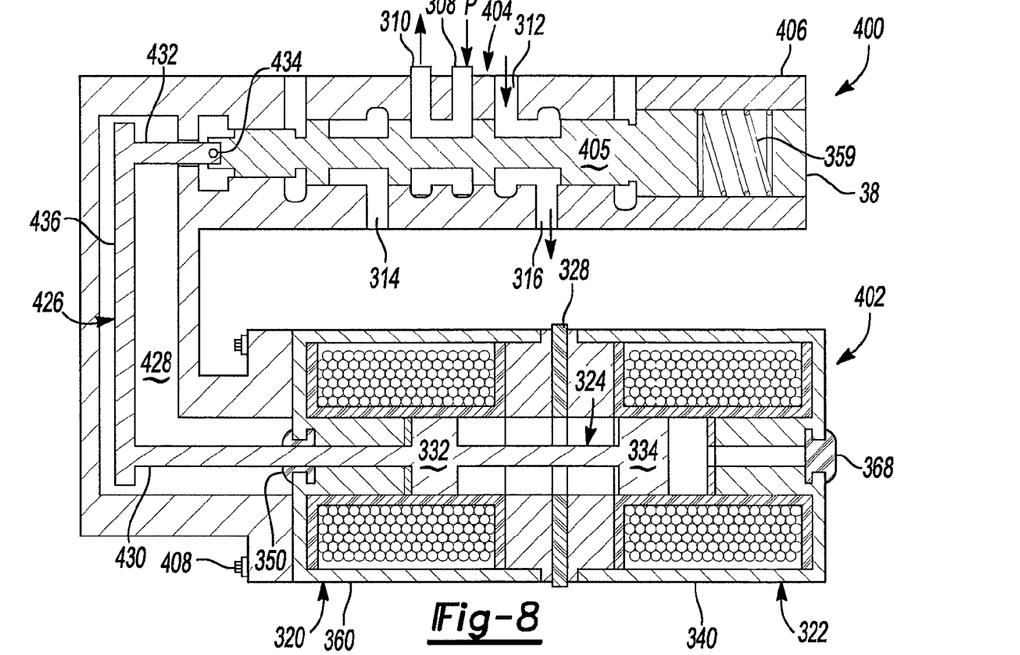
FIG. 8 is a partial cross-sectional view of another dual electromagnetic valve assembly according to the principles of the present disclosure showing the electromagnetic valve assembly in a Park position.
Figure 9:
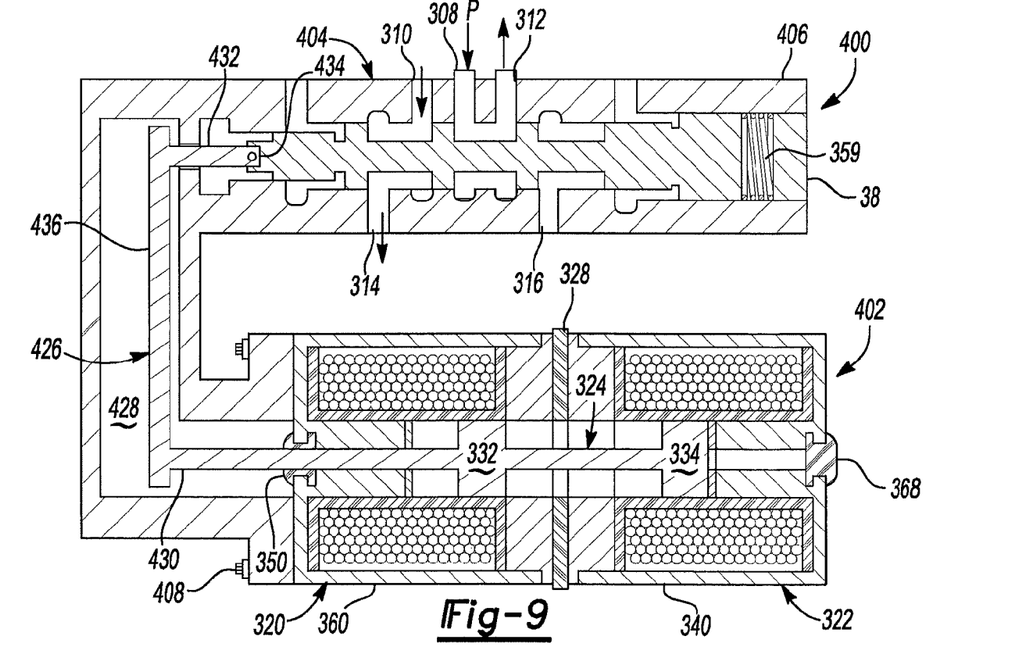
FIG. 9 is a partial cross-sectional view of the electromagnetic valve assembly of FIG. 8 shown in an Out-of-Park position.

FIGS. 8-9 depict another ETRS system identified at reference numeral 400. ETRS system 400 is substantially similar in structure and function to ETRS system 300. For clarity, like reference numerals are used to identify like components and only those elements that differ in structure or function will be discussed in detail. ETRS system 400 includes a DEM solenoid assembly 402, a park servo valve 404, hydraulic servo assembly 28 (FIG. 2), detent lever assembly 30 (FIG. 2) and park inhibit solenoid assembly 32 (FIG. 2). In contrast to DEM solenoid assembly 302, DEM solenoid assembly 402 is disposed on an axis parallel to and offset from park servo valve 404. Similar to DEM solenoid assembly 302, DEM solenoid assembly 402 is selectively operable to move a spool 405 of park servo valve 404 between a first position (FIG. 8) and a second position (FIG. 9) to control the flow of pressurized fluid to hydraulic servo assembly 28 and thereby induce the rotation of detent lever 62 to shift the transmission between a Park and Out-of-Park position as previously described.

DEM solenoid assembly 402 and park servo valve 404 are shown supported by a housing 406 associated within transmission 14 that defines a valve body having a series of ports and fluid flow passages as previously provided. In particular, spool 405 is slidably supported within housing 406 for movement between a first position associated with shifting the transmission into a Park range and a second position associated with shifting the transmission into an Out-of-Park range. As shown, DEM solenoid assembly 402 is disposed along an axis parallel to and offset from the axis of park servo valve 404 and is coupled to housing 406 proximate park servo valve 404 by threaded fasteners 408.

DEM solenoid assembly 402 includes first coil assembly 320, second coil assembly 322, armature 324, intermediate mounting plate 328, and a valve control rod 426. While coil assemblies 320, 322, armature 324, and intermediate mounting plate 328 have the same structure and general function as previously described, it should be noted that in operation, first coil assembly 320 and second coil assembly 322 are selectively operable to move spool 405 between its first and second positions in an opposite manner as previously described due to the orientation of DEM solenoid assembly 402 relative to park servo valve 404. More specifically, first coil assembly 320 is operable to move spool 405 to its first position (Park), while second coil assembly 322 is operable to move spool 405 to its second position (Out-of-Park).

Valve control rod 426 is disposed within a cavity 428 of housing 406 and extends between DEM solenoid assembly 402 and park servo valve 404, having a first end 430 threadingly engaged with first end 332 of armature 324 and a second end 432 coupled to one end of spool 405 by a pin 434. First end 430 is slidably supported by and extends through a portion of housing 360 of first coil assembly 320. Second end 432 extends through and is slidably supported by a portion of housing 406 of transmission 14 proximate park servo valve 404. Valve control rod 426 further includes a body 436 adapted to translate second end 432 along the axis of park servo valve 404 in response to movement of first end 430 along the axis of DEM solenoid assembly 402. While valve control rod 426 is shown as one piece, it should be appreciated that valve control rod 426 may comprise individual components. Furthermore body 436 may comprise a linkage assembly operable to scale the force and displacement of second end 432 in response to movement of first end 430. Finally is should be noted that first end 430 and second end 432 may extend through housing 406 such that body 436 is positioned outside housing 406.

In operation, first coil assembly 320 and second coil assembly 322 may be selectively operated to shift the transmission between a Park and Out-of-Park range. Specifically, when a shift from a Park to an Out-of-Park range is desired, TCM 18 or optional park control module 19 simultaneously energizes second coil assembly 322 and de-energizes first coil assembly 320 to induce armature 324 to move from a Park to an Out-of-Park position (FIG. 8) against the biasing force of bias spring 359. Conversely, when a shift from an Out-of-Park to a Park range is desired, TCM 18 or optional park control module 19 simultaneously energizes first coil assembly 320 and de-energizes second coil assembly 322, inducing armature 324 to move from an Out-of-Park to a Park position (FIG. 8) and thereby assist bias spring 359 to move park servo valve 404. DEM solenoid assembly 402 may be selectively operated in a manner similar to DEM solenoid assembly 302 to improve the response time of transmission 14 in shifting between a Park and Out-of-Park range.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A solenoid control system for implementation with an electronic range selection system that shifts a transmission range between a park position and an out-of-park position, comprising:
    a first solenoid assembly operable to control a fluid valve to supply pressurized fluid to urge a valve spool toward a first position;
    a second solenoid assembly operable to control another fluid valve to supply pressurized fluid to urge said valve spool toward a second position; and
    a control module that selectively energizes one of said first and second solenoids based on a transmission fluid temperature.

2. The solenoid control system of claim 1 wherein said first position of said valve spool provides pressurized fluid to an actuator shifting the transmission into said park position.

3. The solenoid control system of claim 2 further including a spring biasing said valve spool toward said first position.

4. The solenoid control system of claim 3 wherein said first position corresponds to said park position.

5. The solenoid control system of claim 1 wherein said first and second solenoids are positioned at opposite ends of a housing containing said valve spool.

6. The solenoid control system of claim 1 wherein said second solenoid is controlled to supply said pressurized fluid when said transmission fluid temperature is below a threshold value.

7. The solenoid control system of claim 4 wherein said first solenoid is controlled to supply pressurized fluid to urge said valve spool toward said first position and assist said spring when said transmission fluid temperature is below a threshold value.

8. The solenoid control system of claim 1, wherein said valve, said another valve and said valve spool are positioned within a common housing.

9. The solenoid control system of claim 2 further including a shift mechanism for translating a lug between said park and said out-of-park position, said actuator operable to apply a force to said shift mechanism to translate said lug.

10. A dual electro-magnetic valve (DEM) assembly for implementation with an electronic transmission range selection system that shifts a transmission range between a park position and an out-of-park position, comprising:
    a park servo valve moveable between a first position to enable the flow of pressurized fluid in a first flow path and a second position to inhibit the flow of pressurized fluid in said first flow path;
    a solenoid assembly operable to move said park servo valve between said first position and said second position, said solenoid assembly coupled to said park servo valve and including a first coil assembly operable to move said park servo valve toward said second position and a second coil assembly coaxially aligned with said first coil assembly and operable to move said park servo valve toward said first position.

11. The DEM assembly of claim 10, wherein said solenoid assembly includes an armature coupled to said park servo valve and having a first end disposed within said first coil assembly and a second end disposed within said second coil.

12. The DEM assembly of claim 11 wherein said first and second ends of said armature include magnets, said first end being driven into engagement against a stop when said first coil is energized.

13. The DEM assembly of claim 10, wherein said solenoid assembly is coaxially aligned with said park servo valve.

14. The DEM assembly of claim 10, wherein said first coil and said second coil are positioned at one end of said park servo valve.

15. The DEM assembly of claim 10, wherein said solenoid assembly and said park control valve are positioned parallel to one another, said DEM assembly further including a control rod assembly interconnecting said solenoid assembly and said park control valve.

* * * * *